May 26, 1964  E. M. PARSEN  3,134,492
BOOM LOADING DEVICES

Filed Feb. 17, 1961  2 Sheets-Sheet 1

INVENTOR.
EDWARD M. PARSEN
BY
Joseph G. Werner
ATTORNEY

May 26, 1964  E. M. PARSEN  3,134,492

BOOM LOADING DEVICES

Filed Feb. 17, 1961  2 Sheets-Sheet 2

INVENTOR.
EDWARD M. PARSEN
BY
Joseph G. Werner
ATTORNEY

United States Patent Office 3,134,492
Patented May 26, 1964

3,134,492
BOOM LOADING DEVICES
Edward M. Parsen, Box 123, Miller, S. Dak.
Filed Feb. 17, 1961, Ser. No. 90,142
10 Claims. (Cl. 214—138)

This invention relates to loading and unloading boom devices to vehicles, and to holding such devices in a fixed working position.

An important object of this invention is to provide a means for loading upon a transporting vehicle and unloading from such vehicle boom devices such as a backhoe mechanical shovel which, when in working position, will be strong and stable, and in a loaded position for transportation will have a minimum height and length and will easily be transported from place to place.

Another object of this invention is to provide such means which is self-loading and self-unloading with respect to the transporting vehicle wherein the loading and unloading operations are performed quickly and efficiently.

An additional object of this invention is to provide such means wherein the stability of the loaded transporting vehicle is substantially increased by lowering the cetner of gravity and by placing the center of gravity forward of the rear axle of the vehicle.

A further object of this invention is to provide such means which can be economically manufactured and assembled to various types of transporting vehicles.

Other objects and advantages will be apparent from the following detailed explanation in conjunction with the accompanying drawings wherein a preferred embodiment of the principles of the invention has been selected for exemplification. Each part is designated by the same numeral in all drawings.

In the accompanying drawings, FIG. 1 is a perspective side view of a backhoe shovel mounted upon the rear frame of a truck with my device. In FIG. 1 the backhoe shovel is in a working position.

Figure 1:
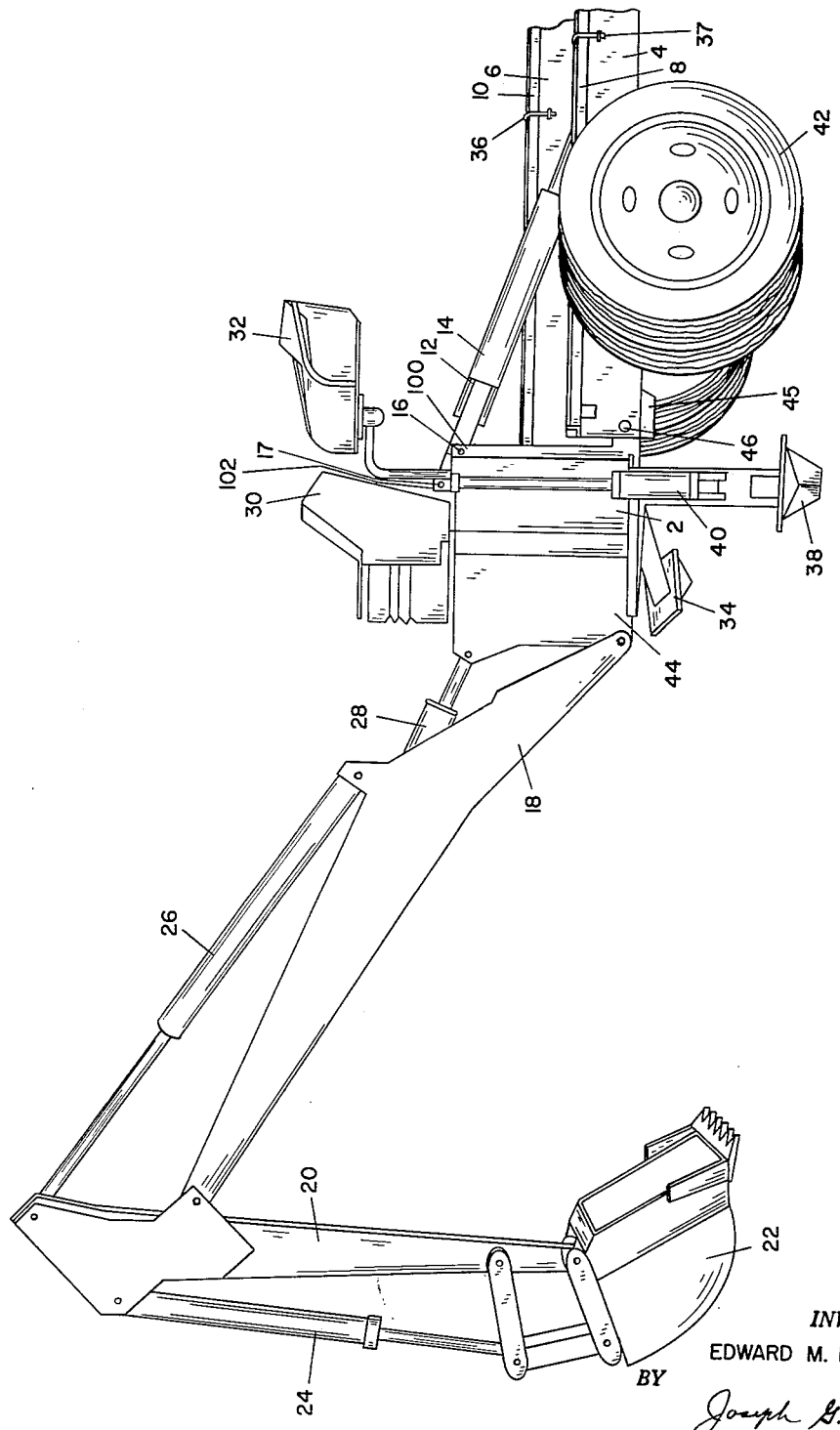

In FIG. 1, the element 2 is the mounting frame for a backhoe. The backhoe is a mechanical shovel which has the open portion of its digging element, hereafter referred to as the bucket, substantially facing its mounting frame. One type of backhoe is illustrated by the elements 18, 20, 22, 24, 26, 28, 30, 32, 34, 38, 40 and 44. The swing table 44 is a swivel mounting for the boom 18 whereby said boom may be moved laterally from one direction to another. The boom 18 is hinged to the swing table 44. The hydraulic piston and cylinder combination 28 controls the vertical movements of the boom. The dipper stick 20 is hinged to the boom and the hydraulic piston and cylinder combination 26 causes the dipper stick to move backward and forward in a plane vertical to the ground. The bucket 22 is hinged to the dipper stick 20 and the hydraulic cylinder and piston combination 24 cause the bucket 22 to move backward and forward in a plane vertical to the ground. The elements 34 and 38 are stabilizing outriggers hinged to the mounting frame 2. Each outrigger is held in place and moved by an hydraulic cylinder and piston combination, one of which is designated by the numeral 40. The control panel 30 and the seat 32 are attached to the mounting frame 2.

The numerals 4 and 6 designate side members of the truck frame. The mounting frame 2 is shown as having a hinged relationship to the truck frame member 4 at the point 46. There is a similar relationship between said mounting frame and the truck frame member 6.

The members 8 and 10 are bed pieces which are bolted to the side members 4 and 6 by the U bolts 36 and 37.

The hydraulic cylinders 12 and 14 are hinged at the points 16 and 17 to the angle iron members 100 and 102 which are attached to mounting frame 2. These hydraulic cylinders have respective pistons 13 and 15 hingedly secured to hinge supports 90 and 91, as appears in FIG. 3.

In FIG. 1, operation of the hydraulic cylinders 12 and 14 causes the mounting frame 2 to move on its hinged positions aforesaid from a vertical or operative position to a horizontal or folded position between the frame members 4 and 6.

Figure 2:
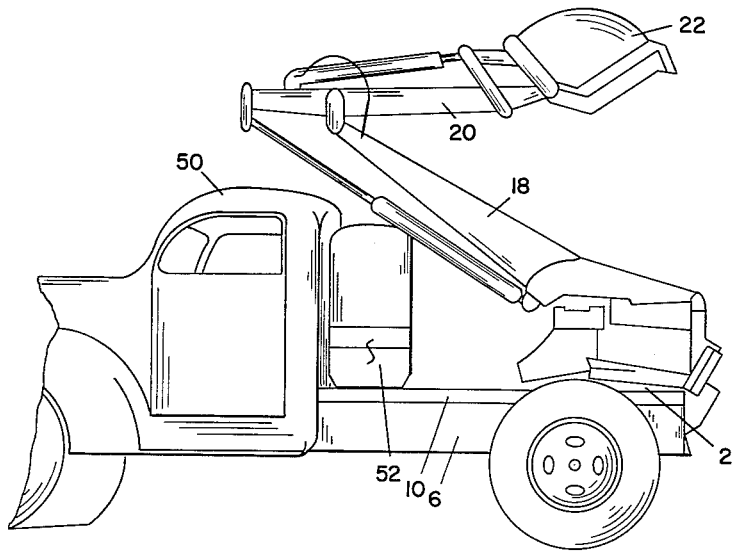
FIG. 2 is a perspective side view of the device shown in FIG. 1 wherein the backhoe is in a loaded position upon a truck ready for transportation.

In FIG. 2 the mounting frame 2 is shown in a horizontal position. It is almost entirely hidden by the truck side frame member 6 and the bed piece 10. The backhoe elements 18, 20 and 22 are shown in a folded position extending forward from the mounting frame 2 to a point over the truck cab 50. A separate power unit 52 or a power take-off from the truck motor may be used to operate the hydraulic system of the backhoe as well as the hydraulic cylinders 12 and 14.

The method I have used to load a backhoe on a truck is as follows:

I used a 134 inch wheel base, 1½ ton truck of the length of 60 inches from the rear of the cab to the centerline of the rear axle. The truck was equipped with dual wheels as shown by the numeral 42 in FIG. 1. My invention enables one to use a short wheel base truck, thus improving versatility and convenience in getting into small working places and improving maneuverability on the highway. My invention enables a backhoe and other boom devices to be loaded upon a short wheel base truck in a manner whereby the boom device does not extend beyond the frame of the truck, thus insuring safety in transportation as well as maneuverability.

Figure 3:
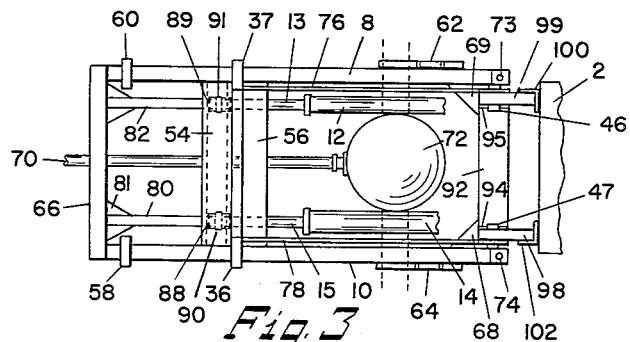
FIG. 3 is a top plan view of a portion of a truck frame and a portion of the mounting frame for a backhoe, which mounting frame is in a vertical position in relation to the frame of the truck. The said mounting frame and said truck frame are held in position by elements of my invention.
Figure 4:
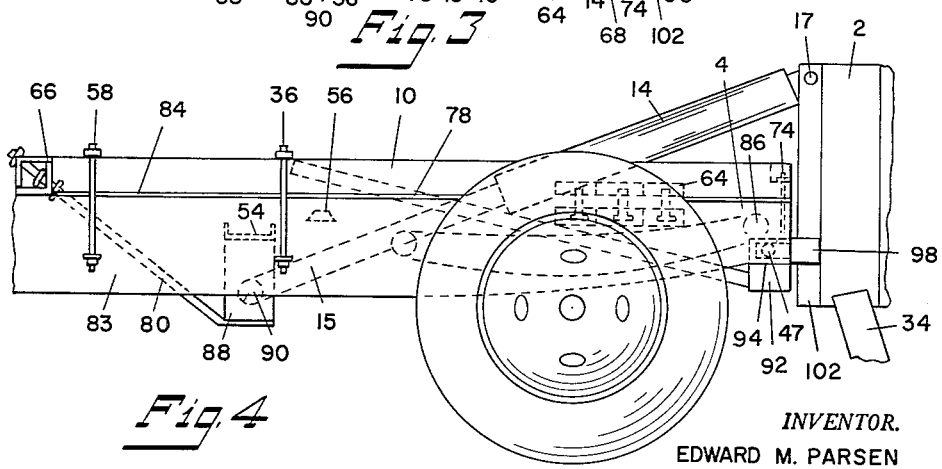
FIG. 4 is a side elevation view of a portion of the truck frame and a portion of the mounting frame for a backhoe, which mounting frame is in a vertical position in relation to the truck frame. It shows, among other things, a hydraulic cylinder and piston combination extending from a position below the truck frame to a position at the top of the mounting frame.

Using the aforesaid truck, the side members 4 and 6 (FIGS. 1 and 4) were cut off just to the rear of the rearmost spring hangers 86 (FIG. 4). This left only the said side members of the truck frame from about the rear spring hangers forward to the truck frame cross member 56 noted in FIGS. 3 and 4.

I reinforced the truck frame. Thus I bolted wide steel plate (83, FIG. 4) on the side members 4 and 6, from the rear spring hangers of the truck front springs to the extreme rear ends of such side members. This process I call fish plating.

The side members were further reinforced by what I call bed pieces. These are I-beam steel box frames shown as the numerals 8 and 10 in FIGS. 1, 2, 3 and 4. They extend from the rear of the truck cab to the end of the side members 4 and 6. Between such box frames 8 and 10 and the side members 4 and 6, a piece of 1 x 4 inch hardwood (84, FIG. 4) was inserted to form a cushion for bolt and rivet heads. Each box frame is made by welding a piece of ½ x 3 inch steel strap to each open side of a 3 inch I-beam to form a box. An additional ½ by 4 inch steel strap was welded to one flat side of the I-beam. This latter side was placed downward.

A front cross member (66, FIGS. 3 and 4) in the form of two 3 inch by 3 inch angle sides which are ½ inch thick and are welded together so as to form a box, was welded in place in front of the said I-beam steel box frame. Said box frames 8 and 10 were held in place by the U-bolts 36, 37, 58 and 60 shown in FIGS. 1, 3 and 4, by the flanged frame anchors 62 and 64 shown in FIGS. 3 and 4, and by the through bolts 73 and 74 shown in FIGS. 3 and 4.

The rear cross member 92, shown in FIGS. 3 and 4, was set below the truck frame members 4 and 6 and attached to plates, one of which is designated by the numeral 45 in FIG. 1, which in turn are respectively attached to the inner sides of members 8 and 10. The member 92 is webbed to said plates as shown by the numerals 68 and 69 in FIG. 3. The cross member 92 was a ½ x 3 x 4 inch channel iron.

The cross member 54 was welded in place as shown in FIGS. 3 and 4. It was ½ x 3 x 4 inch channel iron.

Hinge supports 94 and 95 were constructed above the rear cross member 92. These hinge supports were hinged at the points 46 and 47, shown in FIGS. 1, 3 and 4, to the ears 98 and 99 which in turn were welded and webbed with ½ inch steel plate to the ½ x 3 x 4 inch angle irons 100 and 102. The latter angle irons were welded to the mounting frame 2 of the backhoe. In this manner, said mounting frame was made to bear a hinged relationship to the frame of the truck. I have illustrated a method by which the hinging may occur so as to achieve maximum roadibility when the backhoe is loaded, and maximum useability when the backhoe is unloaded.

Below the cross-member 54, I welded hinge supports 88 and 89, as shown in FIGS. 3 and 4. The hydraulic pistons 13 and 15, which are in combination with the hydraulic cylinders 12 and 14, were hinged to said hinge supports at the points 90 and 91. See FIGS. 3 and 4. Said hydraulic pistons and cylinders were of sufficient length and the cross-member 54 and the hinge supports attached thereto were in such a position that said cylinders and pistons would be fully extended when the mounting frame 2 and the backhoe were in a digging position, and substantially fully withdrawn when the backhoe was in a loaded position.

All hinge holes were fitted with bronze bushings. Heavy steel pins were used for all hinges.

The 1 x 3 inch steel braces 80 and 82 were inserted through and welded to the cross member 66 and the hinge supports 88 and 89, as shown in FIGS. 3 and 4, so as to give rigidity to the frame when the backhoe is in working condition. Said braces also furnish tensile strength when the backhoe is in the process of being loaded. Said braces are webbed with ½ inch steel plate as shown by the numeral 81. Webbing was used whenever feasible at points of stress. The braces 88 and 89 are also beaded by arc welding at the points where they protrude through the member 66. See FIGURE 4.

The 1¼ x 1¼ inch steel braces 76 and 78 were welded to the rear cross member 92 and to the bed pieces 8 and 10. One-half inch steel plating was used to web said braces to said bed pieces 8 and 10, and was also used to web said braces to the cross-member 92.

It will be observed from FIG. 4 that when the braces 76 and 78 are taken together with the hydraulic pistons 13 and 15 and the hydraulic cylinders 12 and 14 in extended position form sturdy X braces. These members interact so as to give the backhoe essential support when it is being operated. When the hydraulic members 12, 14, 13 and 15 are used to lift the backhoe onto the truck, said hydraulic members interact with the braces 76 and 78 which furnish tensile strength in holding the member 92 and the supports contained thereon in place.

As appears from FIG. 3, the hydraulic pistons 13 and 15 and the hydraulic cylinders 12 and 14 lie on either side of the drive shaft 70 and the differential 72.

The words "mounting frame" used in this application may be taken to include a frame in two detachable sections, one section being hinged to said hydraulic piston and cylinder combinations and at points 46 and 47 and one section being attached to the boom device.

The backhoe that I used had a hydraulic system. I diverted oil from the outrigger cylinder 40 shown in FIG. 1 to the cylinders 12 and 14 which I call load-unload cylinders. This eliminated the necessity of a separate hydraulic system.

To load the machine, the operator's seat 32 shown in FIG. 1 is removed. Oil is then diverted to the load-unload cylinders. The boom 18 shown in FIG. 1 is lowered and the boom down-pressure valve is opened. The outrigger valve from which oil has been diverted, as above stated, is opened at the same time. The mounting frame 2 shown in FIGS. 1, 2, 3 and 4 immediately begins to pull back toward the truck cab 50 shown in FIG. 2 and soon is in nearly a horizontal position. The boom down-pressure valve and said outrigger valve, which, as aforesaid, is used for the load-unload cylinders, are released. Boom lift pressure is applied until the boom is lifted to its highest position. The dipper stick 20 shown in FIGS. 1 and 2 is brought toward the boom as closely as possible. The backhoe is thus folded together. When the backhoe is loaded, the said outrigger valve (for the load-unload cylinders) is opened again and the backhoe frame 2 is brought into a horizontal position which is a cradle position as shown in FIG. 2. To keep the backhoe in position while in transit, the valve for the load-unload cylinders is kept open until the hydraulic system by-pass valve opens. This forces oil into the load-unload cylinders and the system pressure is thus locked in to hold the backhoe firmly in position. A keeper pin is inserted in the swing table 44 shown in FIG. 1 to keep the boom from swinging from side to side.

To unload, the valve for the load-unload cylinders is reversed. The backhoe then moves back into operation position. After the backhoe is unloaded, the valve for the load-unload cylinders is held open until the hydraulic system by-pass valve opens. When this occurs, system pressure is locked in the load-unload cylinders as before and holds the backhoe in operating position as a firmly integrated part of the truck.

An oil flow restricter was used in the load-unload system to prevent excessive fast operation which might cause injury. But even with the restriction, it is possible to unload or load the backhoe within the time of approximately one minute.

While I employed my invention in connection with a 1½ ton automotive truck, it is to be understood that my invention is not limited to such a type of truck. Other prime movers of sufficient strength to carry the machine involved may be used. A cab-forward type truck may be used. The World War II U.S. Army vehicle commonly called the "Burma Jeep" may be used, as well as other types of vehicles. My invention may also be used for loading backhoes and frames on vehicles which are not prime movers but merely trailers. The word "truck" used in this specification will be deemed to apply to and include all such and similar vehicles.

While I have employed my invention in connection with a so-called backhoe, it is to be understood that the invention is not so limited. It may be used with other devices using booms of a nature similar to that used in the backhoe.

My invention may be used with non-hydraulic elements substituted for the elements 12, 13, 14 and 15. For example, cable means could be used to load or unload the boom and detachable braces could be substituted for said elements when the boom is in an unloaded and working position.

While I have described a preferred embodiment of my invention, it will be understood that this is to be taken as illustrative and not limitative and that changes in form construction and arrangement of parts may be made without departure from the scope of my invention. My

I claim:

1. A foldable power operated boom construction comprising in combination with a vehicle having a chassis including outer side frame members and sets of front and rear support wheels, a boom assembly on the rear of said chassis including a mounting frame carrying a boom for movement therewith and for movement relative thereto, an implement movably mounted on said boom, means retaining said mounting frame against longitudinal and lateral movement relative to said chassis and pivoting said mounting frame directly to said chassis side members for vertical swinging movement, actuating means connected to said boom and implement for operating the latter, power operating means connected to said mounting frame and to said chassis side frame members for causing pivoting of said mounting frame and the boom carried thereby between a lowered operating position with the boom extending rearwardly from said chassis and a raised inoperative position, said boom in said raised position extending horizontally and forwardly of said chassis and entirely forwardly of the chassis rear end, the parts being so arranged that in said raised position said mounting frame will be cradled and lowered in said chassis between said side frame members and will extend forwardly of said rear wheels.

2. The combination of claim 1 wherein said mounting frame has a table pivotably mounted thereon for horizontal swinging movement about a vertical axis, said boom being mounted upon said table.

3. The combination of claim 2 including pivot means connecting said boom to said table for vertical swinging movement about a horizontal axis, actuating means connected to said boom and to said table for effecting lifting and lowering of said boom.

4. The combination of claim 1 including movable outriggers attached to opposite sides of said mounting frame, operating means connected each to an outrigger and said mounting frame to effect extension and retraction of said outriggers.

5. The combination of claim 1 wherein said implement includes a dipper stick pivoted at one end to said boom and having a tool at its other end, actuating means connected to said dipper stick and to said boom to effect swinging movement of said dipper stick about a horizontal axis extending through the pivot at the end of said dipper stick.

6. The combination of claim 5 wherein said tool is pivotally connected to said other end of said dipper stick, actuating means connected to said tool and to said dipper stick to effect swinging movement of said tool relative to said dipper stick.

7. The combination of claim 1 wherein said power operating means is disposed between said side frame members and lies below the latter when said boom is folded inward over said chassis.

8. The combination of claim 1 wherein said power operating means comprises fluid pressure actuated cylinder and piston units each having one end thereof secured to said mounting frame below the side frame members and each having its other end secured to said chassis intermediate the front and rear thereof and below the bottom of said side members.

9. The combination of claim 1 including hinge means attaching one end of said mounting frame to the rear ends of said side frame members, said power operating means being secured to said chassis below said side frame members and to the opposite end of said mounting frame from said hinge means for folding the frame about the latter between vertical and horizontal positions, said boom in the horizontal position of said mounting frame being disposable horizontally of and entirely above said chassis and with said mounting means being recessed between said side frame members whereby to lower the center of gravity and over-all height and to reduce the over-all length of said chassis.

10. The combination of claim 9 wherein said set of rear wheels is mounted upon chassis rear wheel spring assemblies, said assemblies being connected to said chassis side members at the rear ends of the latter.

References Cited in the file of this patent

UNITED STATES PATENTS

| | | |
|---|---|---|
| 2,109,388 | Heller | Feb. 22, 1938 |
| 2,782,939 | Bernaerts | Feb. 26, 1957 |
| 2,870,924 | Wills | Jan. 27, 1959 |
| 2,897,986 | Davis | Aug. 4, 1959 |